(12) United States Patent
Cui et al.

(10) Patent No.: US 11,130,519 B1
(45) Date of Patent: Sep. 28, 2021

(54) PARALLEL MANEUVERING SYSTEM

(71) Applicants: Kan Cui, Mercer Island, WA (US); Margaret C. Liu, Mercer Island, WA (US); Samuel K. Liu, Mercer Island, WA (US)

(72) Inventors: Kan Cui, Mercer Island, WA (US); Margaret C. Liu, Mercer Island, WA (US); Samuel K. Liu, Mercer Island, WA (US)

( * ) Notice: Subject to any disclaimer, the term of this patent is extended or adjusted under 35 U.S.C. 154(b) by 0 days.

(21) Appl. No.: 17/324,041

(22) Filed: May 18, 2021

(51) Int. Cl.
| | |
|---|---|
| *B62D 7/14* | (2006.01) |
| *B62D 21/03* | (2006.01) |
| *B62D 7/18* | (2006.01) |
| *B62D 21/14* | (2006.01) |
| *B62D 7/15* | (2006.01) |

(52) U.S. Cl.
CPC ............ *B62D 7/1581* (2013.01); *B62D 7/142* (2013.01); *B62D 7/1509* (2013.01); *B62D 7/18* (2013.01); *B62D 21/03* (2013.01); *B62D 21/14* (2013.01)

(58) Field of Classification Search
None
See application file for complete search history.

(56) References Cited

U.S. PATENT DOCUMENTS

| | | | |
|---|---|---|---|
| 3,876,255 A | 4/1975 | Ilon | |
| 4,257,619 A | 3/1981 | Fisher | |
| 6,491,127 B1 * | 12/2002 | Holmberg | ............ B60K 7/0007 180/21 |
| 6,584,641 B1 | 7/2003 | Milbredt | |
| 8,590,664 B2 * | 11/2013 | Terashima | ............ B62D 5/0418 180/411 |
| 8,960,339 B2 | 2/2015 | Schlee et al. | |
| 9,228,649 B1 | 1/2016 | Cui et al. | |
| 9,701,525 B1 * | 7/2017 | Cui | ........................ B66F 11/04 |
| 9,789,902 B1 | 10/2017 | Cui et al. | |
| 10,259,498 B2 | 4/2019 | Jägenstedt et al. | |
| 10,348,531 B2 * | 7/2019 | Ghosh | ............... H04L 25/03159 |
| 10,568,792 B2 * | 2/2020 | Derenne | .............. A61G 7/0528 |
| 10,678,242 B2 * | 6/2020 | Wiley | .................. G05D 1/0088 |
| 10,800,030 B1 | 10/2020 | Cui et al. | |

(Continued)

FOREIGN PATENT DOCUMENTS

| | | |
|---|---|---|
| CN | 101659288 A | 3/2010 |
| CN | 110001768 A | 7/2019 |
| DE | 202006011602 U1 | 9/2006 |

*Primary Examiner* — Tony H Winner
(74) *Attorney, Agent, or Firm* — Nath, Goldberg & Meyer; Richard C. Litman

(57) ABSTRACT

The parallel maneuvering system is a steering system for portable devices, portable platforms and the like, allowing individual wheels to be steered in a parallel and simultaneous manner. The parallel maneuvering system includes a first coupler and a second coupler, which are slidably mounted with respect to one another, and which each include a pair of arms for eccentric pivotal attachment to a corresponding pair of wheel assemblies. The first and second couplers are mounted within a hollow chassis, and the wheel assemblies are mounted to the hollow chassis such that respective wheels thereof are mounted external to the hollow chassis, and respective eccentric crank arms thereof are mounted within the hollow chassis. At least one linear actuator may be provided for selectively driving sliding movement of the first coupler with respect to the second coupler.

18 Claims, 14 Drawing Sheets

(56) References Cited

U.S. PATENT DOCUMENTS

| | | | |
|---|---|---|---|
| 2005/0108998 A1* | 5/2005 | Hunt | B62D 7/026 56/6 |
| 2005/0236208 A1 | 10/2005 | Runkles et al. | |
| 2008/0048414 A1 | 2/2008 | Van Mill et al. | |
| 2019/0299398 A1 | 10/2019 | Svensson | |

* cited by examiner

PARALLEL MANEUVERING SYSTEM

BACKGROUND

1. Field

The disclosure of the present patent application relates to steering systems, and particularly to a parallel maneuvering system for steering individual wheels in a parallel and simultaneous manner.

2. Description of the Related Art

A wide variety of portable and mobile lifting devices, carrying devices and the like are used throughout many different industries. Such devices are typically mounted on wheels for portability. However, the loads they carry may be both heavy and unbalanced. Thus, the ability to steer the device is not only convenient for its operation, but it becomes necessary to provide stability. Although steering systems for lifting devices, carrying devices and the like are known, they are typically similar to the steering systems associated with two-wheel drive vehicles, and thus do not provide simultaneous steering for all wheels of the device. Given the heavy and unbalanced loads often carried by such devices, particularly in industrial settings, it is desirable to have simultaneous turning of the wheels in order to provide optimal stability for the device.

Additionally, conventional carriers, movers and the like have very little flexibility when it comes to translational displacement in varied directions, as well as experiencing great difficulty when it comes to self-rotation with a minimal turning radius. For example, a vehicle carrying a heavy load in a narrow parking lot environment is typically only capable of moving back and forth in one direction, with little angular deviation, and is not capable of making the typically-necessary tight turns required for entry, egress and repositioning. Further, while attempting such maneuvers, the cargo being carried by the vehicle is subject to shifting, often to the extent that the entire vehicle may be put off-balance. Thus, a parallel maneuvering system solving the aforementioned problems is desired.

SUMMARY

The parallel maneuvering system is a steering system for portable devices, portable platforms and the like, allowing individual wheels to be steered in a parallel and simultaneous manner. The parallel maneuvering system includes a first coupler and a second coupler. The first coupler has a first central bar, a first coupling arm and a second coupling arm, where the first coupling arm is secured to a first end of the first central bar and projects outwardly therefrom, and the second coupling arm is secured to a second end of the first central bar and projects outwardly therefrom. Similarly, the second coupler has a second central bar, a third coupling arm and a fourth coupling arm, where the third coupling arm is secured to a first end of the second central bar and projects outwardly therefrom, and the fourth coupling arm is secured to a second end of the second central bar and projects outwardly therefrom. The second central bar is slidably mounted on the first central bar of the first coupler. The first coupling arm and the second coupling arm may extend from the first central bar in opposite parallel directions and, similarly, the third coupling arm and the fourth coupling arm may extend from the second central bar in opposite parallel directions. Each of the first, second, third and fourth coupling arms may have an adjustable length.

An eccentric steering crank is pivotally secured to the first central bar of the first coupler and is rotated to drive simultaneous steering rotation of the first and second couplers. First, second, third and fourth wheel assemblies are further provided. Each of the first, second, third and fourth wheel assemblies includes a steering yoke, a wheel rotationally mounted on the steering yoke, an electric slip ring mounted on the steering yoke, a kingpin axially received within the electric slip ring, and an eccentric crank arm having opposed first and second ends, where the first end thereof is secured to an upper end of the kingpin, and a wheel crank pin is mounted on the second end thereof. A free end of the first coupling arm is pivotally secured to the wheel crank pin of the first wheel assembly, a free end of the second coupling arm is pivotally secured to the wheel crank pin of the second wheel assembly, a free end of the third coupling arm is pivotally secured to the wheel crank pin of the third wheel assembly, and a free end of the fourth coupling arm is pivotally secured to the wheel crank pin of the fourth wheel assembly. Each of the first, second, third and fourth wheel assemblies may also include a rotor plate disposed between an upper end of the electric slip ring and the eccentric crank arm. Each of the wheels may be any suitable type of wheel, including but not limited to, a self-driven motorized wheel, a self-steering and/or self-driven Mecanum wheel or the like.

The first and second couplers are mounted within a hollow chassis, and the first, second, third and fourth wheel assemblies are mounted to the hollow chassis such that the respective wheels thereof are mounted external to the hollow chassis, and the respective eccentric crank arms thereof are mounted within the hollow chassis. At least one linear actuator may be provided for selectively driving sliding movement of the first central bar of the first coupler with respect to the second central bar of the second coupler.

Additionally, first, second, third and fourth steering brakes may be mounted within the hollow housing for respectively selectively applying braking to angular steering movement of the first, second, third and fourth wheel assemblies.

In one embodiment, the eccentric steering crank is a steering crank pin, and the parallel maneuvering system further includes a rotational actuator, a first drive gear coupled to the rotational actuator, a second drive gear coupled to the first drive gear, and a third drive gear coupled to the second drive gear. The steering crank pin is mounted eccentrically on the third gear. In this embodiment, a clutch may be used to selectively move the second drive gear out of alignment with the first and third drive gears, thus ceasing rotation of the steering crank pin when the clutch is actuated.

In an alternative embodiment, the eccentric steering crank is driven by a steering actuator, which couples rotational movement of a steering gear with the eccentric steering crank. As a further alternative, a mobile platform device may be formed by mounting a hollow platform on at least two of these parallel maneuvering systems, where the hollow chassses thereof are mounted external to the hollow platform, and the steering gears thereof are mounted within the hollow platform. In this embodiment, an endless loop may rotationally couple the steering gears of the at least two parallel maneuvering systems to drive simultaneous steering. A loop tightener may be mounted within the hollow platform for selectively adjusting tightness of the endless loop. One of the steering gears of the at least two parallel maneuvering systems may be directly driven by a steering wheel or the like.

In a further embodiment, at least two of the parallel maneuvering systems may be mounted to a platform having at least one circular track. The at least two parallel maneuvering systems are each pivotally and slidably mounted on the at least one circular track at fixed angular locations with respect to one another. For example, concentric inner and outer circular tracks may be provided. In this embodiment, each parallel maneuvering system steers independently from the other ones of the parallel maneuvering systems, but they are joined in fixed formation by the platform. Each parallel maneuvering system may carry a remotely controlled rotational actuator, motor or the like, which operate simultaneously to drive simultaneous and equal rotation of each steering gear of each parallel maneuvering system. An angular transducer may be coupled to each steering actuator for monitoring and controlling the angular orientation of the corresponding eccentric steering crank. Thus, each of the linked parallel maneuvering systems can monitor its own angular orientation and make any necessary corrections to properly orient itself with respect to the other parallel maneuvering systems linked by the platform. It should be understood that any suitable type of remote control may be used, and that the remote control can also be replaced by, or used in conjunction with, an onboard programmable controller.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
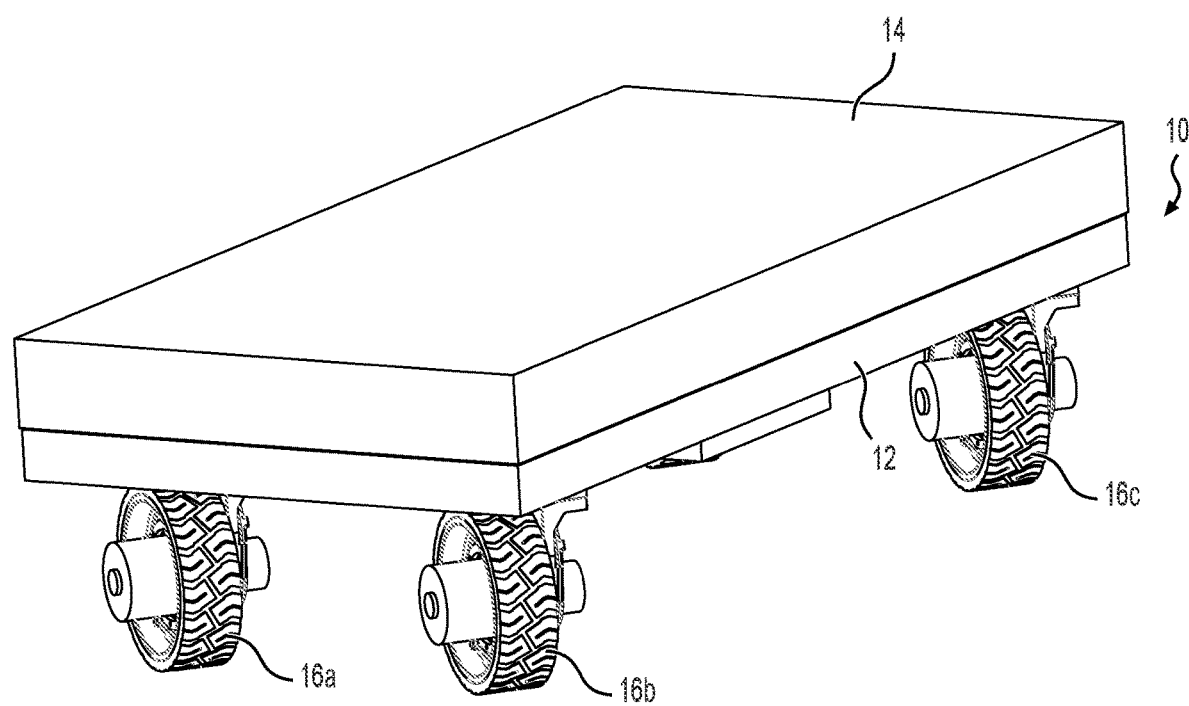
FIG. 1 is a perspective view of a parallel maneuvering system.
Figure 2:
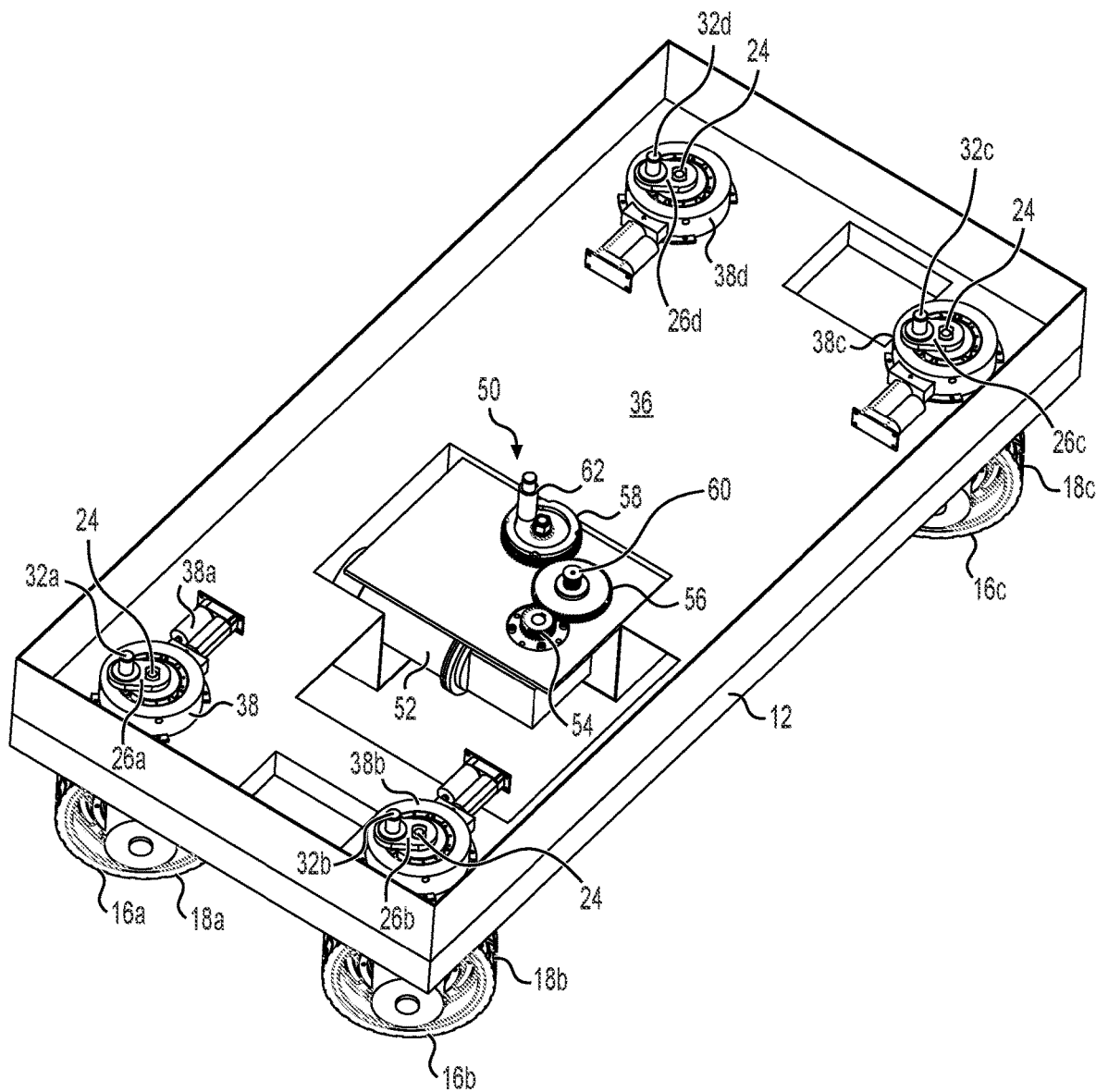
FIG. 2 is a partial perspective view of the parallel maneuvering system of FIG. 1, with the chassis cover and a portion of the internal components removed to show details of the parallel maneuvering system.

As shown in FIGS. 1-3 and 6, the parallel maneuvering system 10 includes a chassis 12, a chassis cover 14 covering the chassis 12, and a plurality of wheel assemblies 16a, 16b, 16c, 16d rotatably mounted to the chassis 12. In FIGS. 1 and 2, the chassis 12 is shown as having a rectangular configuration, and the chassis cover 14 is shown as having a matching configuration for mating with the chassis 12. Additionally, the four wheel assemblies 16a, 16b, 16c, 16d are shown mounted to each corner of the chassis 12. It should be understood that the overall configuration and relative dimensions of the chassis 12 and the chassis cover 14 are shown for exemplary purposes only, and aren't limited to rectangular. Similarly, it should be understood that any suitable number of wheel assemblies may be used, and that the four wheel assemblies 16a, 16b, 16c, 16d are shown for exemplary purposes only. Further, it should be understood that the wheel assemblies 16a, 16b, 16c, 16d may be mounted at any suitable location relative to the chassis 12, and the corner-mounted configuration shown in FIGS. 1 and 2 is shown for exemplary purposes only. In FIG. 2, the chassis cover 14 has been removed to show the interior of the chassis 12.

Figure 3:
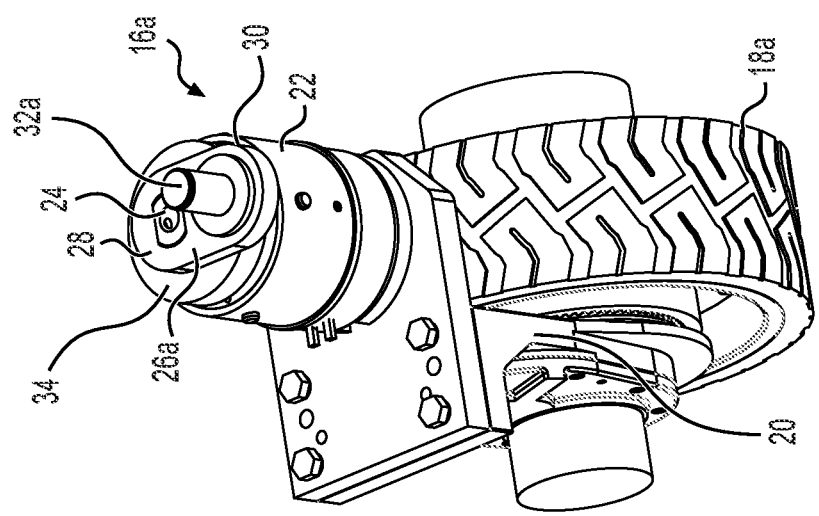
FIG. 3 is a perspective view of an exemplary wheel assembly of the parallel maneuvering system of FIG. 1.

Each wheel assembly may be substantially identical to the other wheel assemblies. FIG. 3 illustrates the wheel assembly 16a, it being understood that each of the remaining wheel assemblies 16b, 16c, 16d is substantially identical. As shown, the wheel assembly 16a includes a steering yoke 20 for mounting a wheel 18a thereon. Wheel assemblies 16b, 16c, 16d have corresponding wheels 18b, 18c, 18d, respectively, and it should be understood that the overall configuration, size and appearance of the wheels 18a, 18b, 18c, 18d are shown for exemplary purposes only. Each of the wheels 18a, 18b, 18c, 18d may be any suitable type of wheel, including but not limited to, a self-driven motorized wheel, a self-steering and/or self-driven Mecanum wheel, or the like. The Mecanum wheel is a well-known omnidirectional wheel design for vehicles and the like, providing driven movement in any direction. The basic Mecanum wheel design is shown in U.S. Pat. No. 3,876,255, issued Apr. 8, 1975 to Ilon, which is hereby incorporated by reference. Briefly, the Mecanum wheel is based on a tireless wheel, with a series of rubberized external rollers obliquely attached to the whole circumference of its rim. These rollers typically each have an axis of rotation at 45° to the wheel plane and at 45° to the axle line. Each Mecanum wheel is an independent non-steering drive wheel with its own powertrain, and generates a propelling force perpendicular to the roller axle when spinning, which can be vectored into a longitudinal and a transverse component in relation to the vehicle.

In the present wheel assemblies, an electric slip ring 22 is mounted on a steering yoke 20 coaxial with a kingpin 24, the steering yoke 20 and attached wheel rotating when the kingpin is rotated. A first end 28 of an eccentric crank arm 26*a* is rigidly attached to an upper end of the kingpin 24, and a wheel crank pin 32*a* is mounted on the second end 30 of eccentric crank arm 26*a*. Each of wheel assemblies 16*b*, 16*c*, 16*d* includes similar corresponding eccentric crank arms 26*b*, 26*c*, 26*d* and wheel crank pins 32*b*, 32*c*, 32*d*, respectively. A rotor plate 34 is disposed between the upper end of the electric slip ring 22 and the eccentric crank arm 26*a*. Driven rotation of the eccentric crank arm 26*a*, as it swings relative to rotor plate 34, drives rotation of the kingpin 24 to steer the wheel 18*a*. The electric slip ring 22 is configured to house wires extending from a power source. When mounted to the chassis 12, as shown in FIG. 2, each wheel assembly has two degrees of freedom, i.e., steering rotation about the vertical axis of the kingpin 24, and rolling of the wheel about its central horizontal axis.

Figure 4:
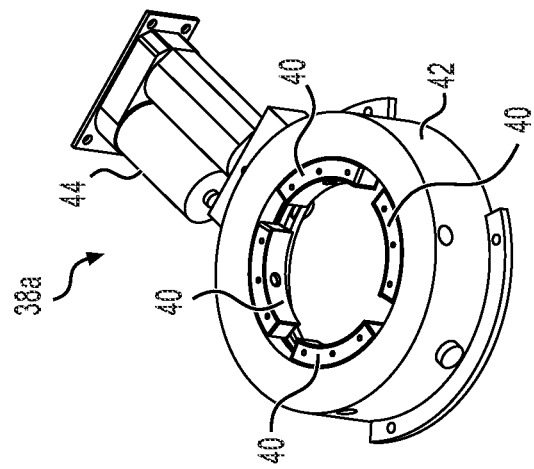
FIG. 4 is a perspective view of an exemplary steering brake of the parallel maneuvering system of FIG. 1.

In order to maintain wheel assemblies 16*a*-16*d* in a parallel steering relationship, a corresponding steering brake 38*a*, 38*b*, 38*c*, 38*d* for each wheel assembly 16*a*, 16*b*, 16*c*, 16*d*, respectively, may be used. As shown in FIG. 2, the wheel assemblies 16*a*, 16*b*, 16*c*, 16*d* are mounted on a base 36 of chassis 12 such that wheels 18*a*, 18*b*, 18*c*, 18*d* are positioned external to chassis 12 and such that the rotor plates and crank arms 26*a*, 26*b*, 26*c*, 26*d* of each wheel assembly 16*a*, 16*b*, 16*c*, 16*d* are positioned inside the chassis 12. The steering brakes 38*a*, 38*b*, 38*c*, 38*d* are mounted on the base 36 within the chassis 12 such that a center line of each steering brake 38*a*, 38*b*, 38*c*, 38*d* is coaxial with the corresponding kingpin. Each of the steering brakes 38*a*, 38*b*, 38*c*, 38*d* may be substantially identical. FIG. 4 illustrates an example 38*a* of one of the steering brakes, which includes a plurality of circumferential brake shoes 40 mounted on an annular housing 42 and actuated by a linear actuator 44. It should be understood that any suitable type of steering brake may be utilized. Steering brakes, such as steering brake 38*a*, are known. Such a steering brake is described in U.S. Pat. No. 11,015,664, issued to the present inventors May 25, 2021, which is hereby incorporated by reference.

Figure 5:
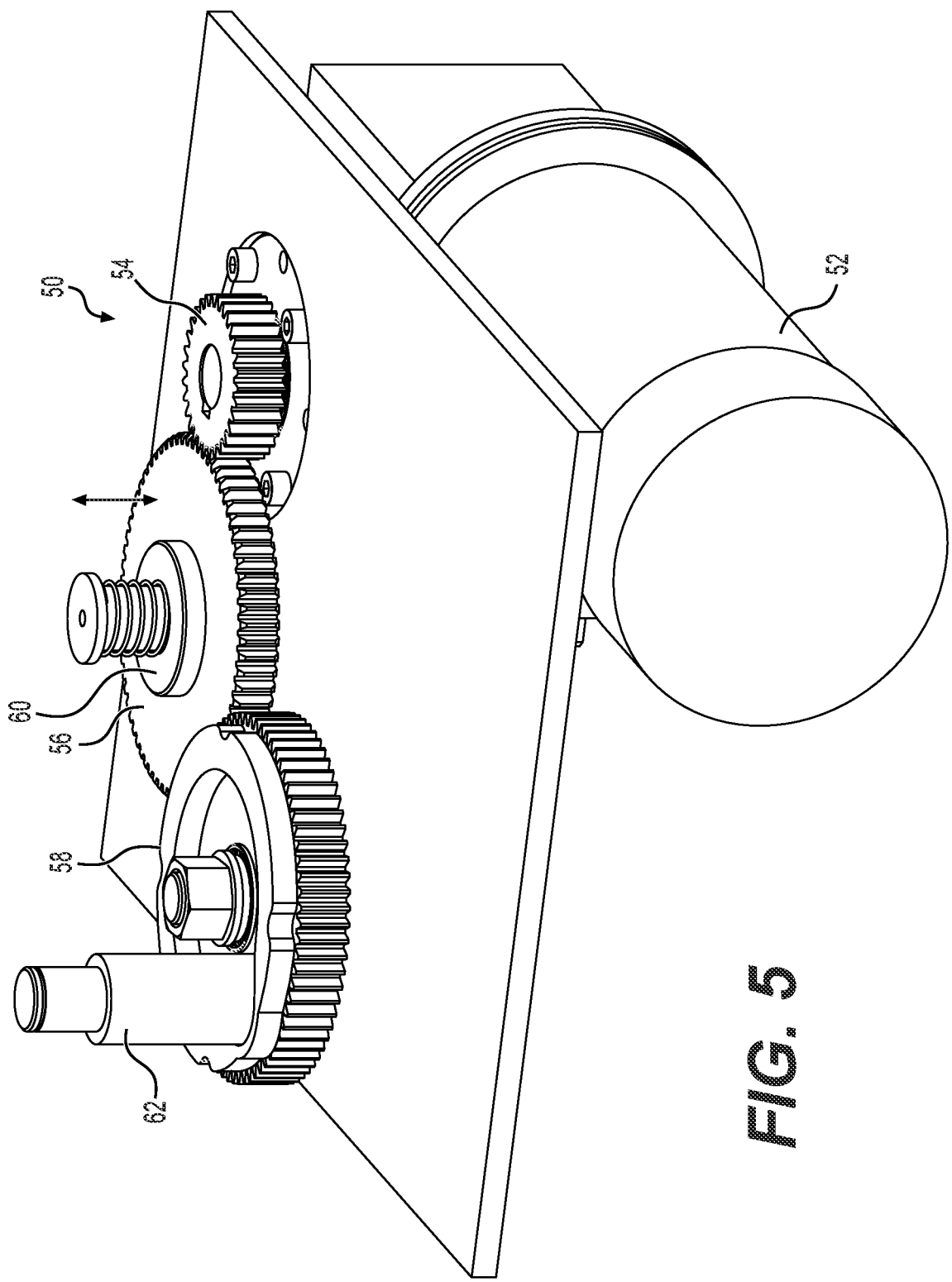
FIG. 5 is a perspective view of an exemplary steering actuator of the parallel maneuvering system of FIG. 1.

As shown in FIG. 2, a steering actuator assembly 50 is mounted substantially centrally on the base 36 of the chassis 12. As shown in FIG. 5, the steering actuator assembly 50 includes an actuator 52 for driving rotation of a first or drive gear 54. It should be understood that the actuator 52 may be any suitable type of actuator for generating driven rotation of first gear 54, such as a rotary actuator, a motor, a linear actuator with a linear-to-rotary coupling, or the like. The first gear 54 is coupled to a third or driven gear 58 through an intermediate second gear 56. The second gear 56 may be raised out of alignment with the first and third gears 54, 58 by a clutch 60, which may be, for example, a solenoid. Thus, when the clutch 60 is disengaged, as in FIG. 5, rotation of the first gear 54 causes the second gear 56 to rotate, which drives rotation of the third gear 58. However, when the clutch 60 is engaged, the second gear 56 is pulled up, out of alignment with the first and third gears 54, 58, thus ceasing the driven rotation of the third gear 58. A steering crank pin 62 is mounted eccentrically on the third gear 58, as shown.

Figure 6:
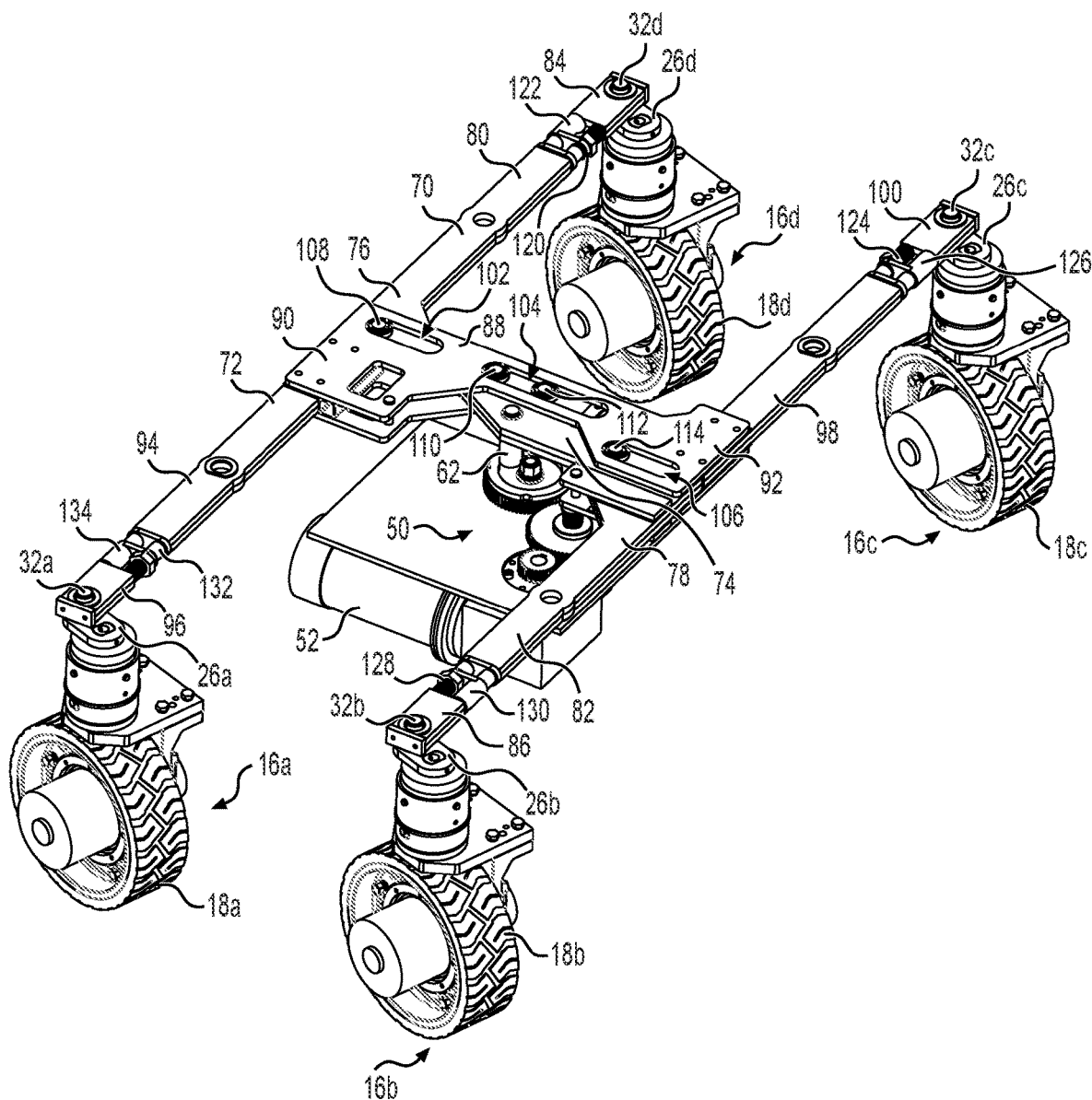
FIG. 6 is a partial perspective view of the parallel maneuvering system of FIG. 1, with the chassis removed to show details of a split steering linkage.

In order to transmit rotational movement of the third gear 58 to each of the wheel assemblies 16*a*, 16*b*, 16*c*, 16*d* to cause the wheel assemblies 16*a*, 16*b*, 16*c*, 16*d* to be steered simultaneously, first and second couplers 70, 72 (or bottom link member 70 and top link member 72) form a steering linkage to connect the steering crank pin 62 to each of the wheel crank pins 32*a*, 32*b*, 32*c*, 32*d* of the wheel assemblies 16*a*, 16*b*, 16*c*, 16*d*, respectively, as shown in FIGS. 6-9. In FIGS. 6-9, the chassis 12 has been removed for purposes of illustration and clarity. The first coupler 70 (or bottom link member 70) includes a central bar 74 having opposed first and second ends 76, 78 including a coupling arm mounting flange extending orthogonally from the ends 76, 78, respectively, of the central bar 74. A first coupling arm 80 (or wheel-mounting arm 80) is attached to and extends from the coupling arm mounting flange at the first end 76 of the central bar 74, and the wheel crank pin 32*d* of the wheel assembly 16*d* is pivotally mounted at the free end 84 thereof. A second coupling arm 82 (or wheel-mounting arm 82) is attached to and extends from the coupling arm mounting flange at the second end 78 of the central bar 74 and the wheel crank pin 32*b* of the wheel assembly 16*b* is pivotally mounted at the free end 86 thereof. The second coupler 72 (or top link member 72) also includes a central bar 88 having opposed first and second ends 90, 92 including a coupling arm mounting flange extending orthogonally from the ends 90, 92, respectively, of the central bar 88. A third coupling arm 94 (or wheel-mounting arm 94) is attached to and extends from the coupling arm mounting flange at the first end 90 of the central bar 88, and the wheel crank pin 32*a* of the wheel assembly 16*a* is pivotally mounted at the free end 96 thereof. A fourth coupling arm 98 (or wheel-mounting arm 98) is attached to and extends from the coupling arm mounting flange at the second end 92 of the central bar 88, and the wheel crank pin 32*c* of the wheel assembly 16*c* is pivotally mounted at the free end 100 thereof. As shown in FIG. 6, steering crank pin 62 is secured to the central bar 74 of the first coupler 70 (or bottom link 70), and the central bar 88 of the second coupler 72 (or top link 72) is mounted on the central bar 74 of the first coupler 70 (or bottom link 70). Thus, as the third gear 58 is driven to rotate, the entire structure formed from first coupler 70 and second coupler 72 is also driven to rotate along the same rotating angular path due to attachment of the crank pin 62 to the first coupler 70 (or bottom link member 70), thus simultaneously driving the steering rotation of each wheel assembly 16*a*, 16*b*, 16*c*, 16*d*.

In the example of FIGS. 6-9, the steering linkage is a substantially H-shaped member in which the first coupling arm 80 and the third coupling arm 94 are linear, and the second coupling arm 82 and the fourth coupling arm 98 are also linear, forming the two parallel legs of the H-shaped steering linkage. The coupling arms 80, 82, 94, and 98 are preferably equal in length, and the first coupling arm 80 extends in a direction opposite that of the second coupling arm 82, and similarly the third coupling arm 94 extends in a direction opposite that of the fourth coupling arm 98. Further, the central bar 74 of the first coupler 70 axially slides with respect to the central bar 88 of the second coupler 72. Referring to FIG. 6, one or more slots 102, 104, 106 may be formed through the central bar 88 of the second coupler 72 for receiving corresponding rollers 108, 110, 112, 114, extend upward from the central bar 74 of the first coupler 70 to maintain the sliding relationship in the axial direction alone, constraining the second coupler 72 to slide on top of the first coupler 70.

Figure 7:
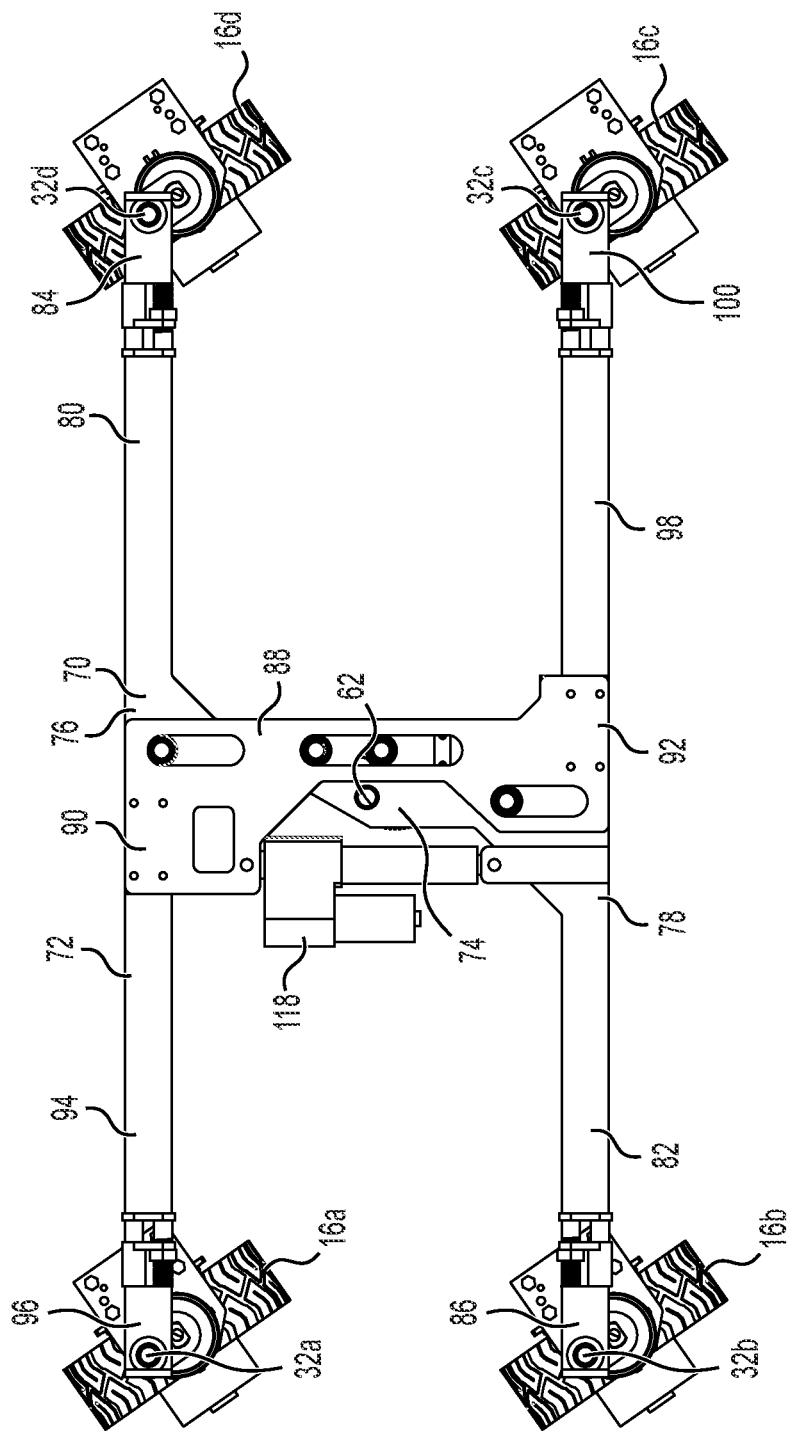
FIG. 7 is a top view of the parallel maneuvering system, with the chassis removed, shown configured for translational movement with the wheels in parallel.
Figure 8:
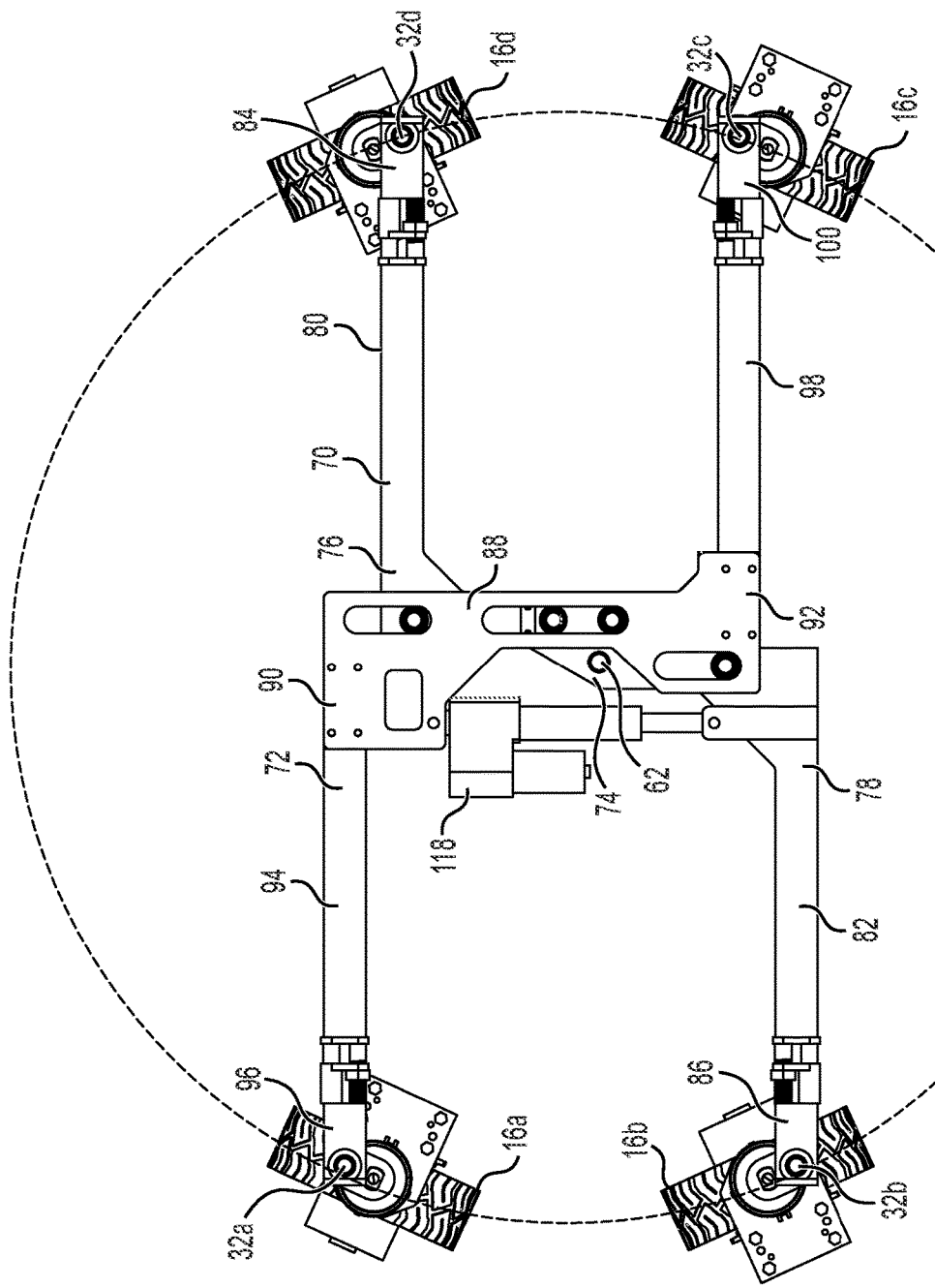
FIG. 8 is a top view of the parallel maneuvering system, with the chassis removed, shown with the wheels configured for rotation with a zero turning radius.
Figure 9:
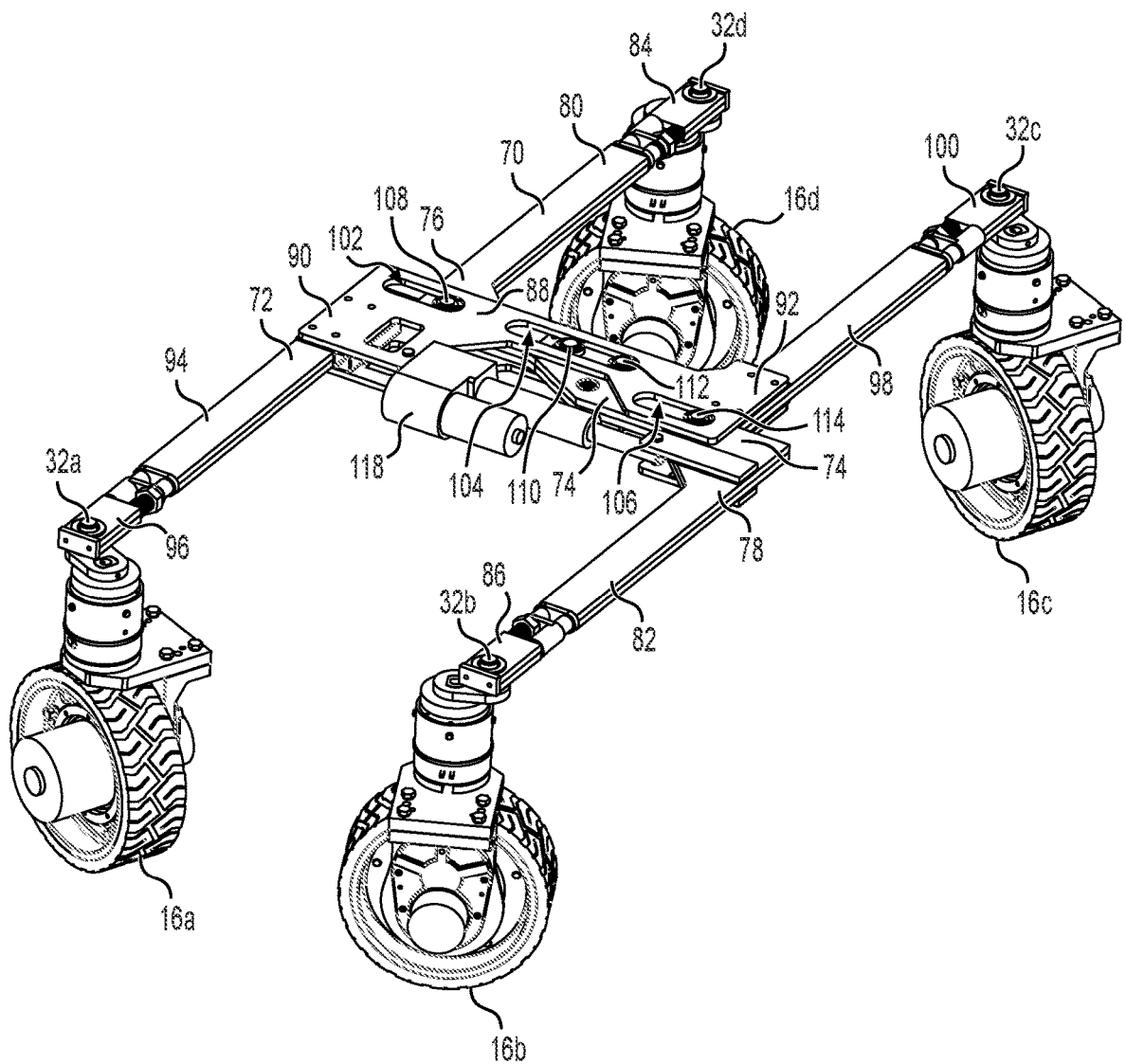
FIG. 9 is a perspective view of the parallel maneuvering system of FIG. 1, with the chassis, shown with the wheels configured for rotation with a zero turning radius.

As shown in FIGS. 6 and 7, when the central bar 74 of the first coupler 70 and the central bar 88 of the second coupler 72 are in a non-expanded relationship, such that first coupler 70 and second coupler 72 form an overall H-shaped structure, wheel assemblies 16*a*, 16*b*, 16*c*, 16*d* are each arranged parallel with respect to one another. However, as shown in FIGS. 8 and 9, it may be desirable for wheel assemblies 16*a*, 16*b*, 16*c*, 16*d* to be steered such that they are not all parallel with respect to one another. Specifically, in the example of FIG. 8, wheel assemblies 16*a*, 16*b*, 16*c*, 16*d* are each steered so that overall movement will be along a circular path (indicated by the dashed lines in FIG. 8). In order to effect this change, at least one linear actuator 118 may be used to axially slide the central bar 88 of the second coupler 72 with respect to central bar 74 of first coupler 70 (or vice versa). It should be understood that the linear actuator 118 may be any suitable type of linear actuator, motor or the like. The linear actuator 118 is omitted from FIG. 6 to show details of the steering linkage assembly. FIG. 7 shows the linear actuator 118 with the cylinder bearing against the second coupler 72 and the piston attached to the first coupler 70, the piston being retracted so that the linked couplers 70, 72 assume the H-shaped configuration. FIG. 8 shows the piston of the linear actuator 118 extended. Since the couplers 70, 72 are constrained to lateral sliding movement by the rollers 108-114 in the slots 102-106, the coupler arms 82 and 94 are driven farther apart, while the coupler arms 80 and 92 are drawn closer together, placing tension on the wheel cranks 26a-26d to turn the wheels 18a-18d into the configuration shown in FIG. 8 so that the device loaded on the chassis makes a zero-radius turn, without any translational movement. When the zero-radius turn is completed, the piston of the linear actuator 118 may be retracted within the cylinder to reconfigure the steering linkage for translational movement with the wheels turning in parallel alignment. Additionally, returning to FIG. 6, as shown, each coupling arm 80, 82, 92, 94 may include a respective arm length adjuster 120, 124, 128, 132, allowing for small adjustments to be made to the length of each coupling arm. Each arm length adjuster 120, 124, 128, 132 may be correspondingly coupled with a rigidity balancer 122, 126, 130, 134, respectively, in order to prevent unwanted rotary movement caused by loosening or tightening of the arm length adjusters 120, 124, 128, 132. In FIGS. 7-9, the steering actuator assembly 50 has been removed in order to clearly illustrate the linear actuator 118 and the relationship between the first and second couplers 70, 72, respectively.

Figure 10:
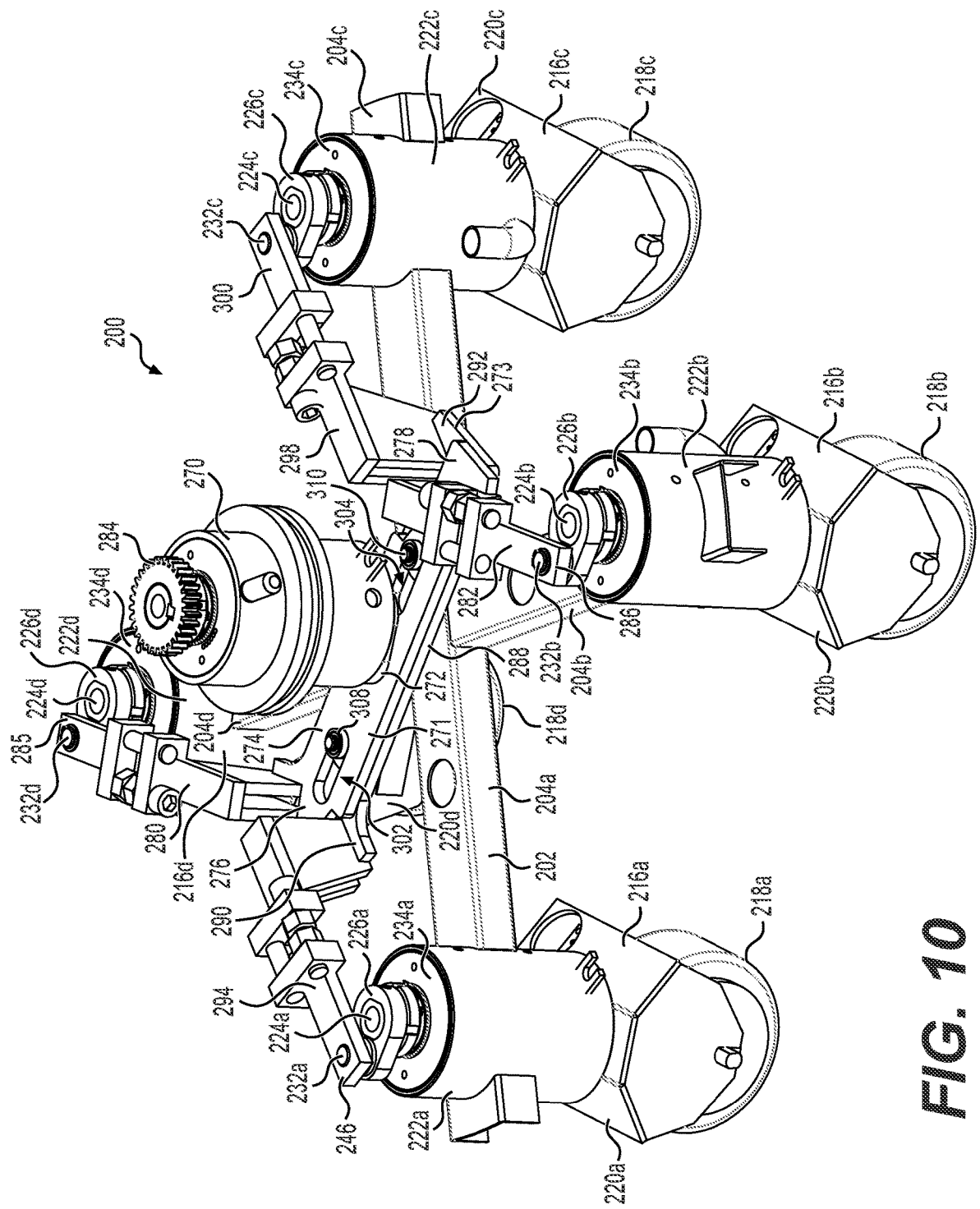
FIG. 10 is a perspective view of an alternative embodiment of the parallel maneuvering system, shown with self-driven wheels mounted on a cruciform frame.

As discussed above, the substantially rectangular configuration shown in FIGS. 1-9 is an example only. FIG. 10 illustrates application of the same principles in the construction of a parallel maneuvering system 200 in a substantially circular configuration. Similar to the previous embodiment, the parallel maneuvering system 200 includes four wheel assemblies 216a, 216b, 216c, 216d, each respectively mounted to a corresponding arm 204a, 204b, 204c, 204d of a cruciform mounting plate 202. It should be understood that the overall configuration and relative dimensions of the mounting plate 202 are shown for exemplary purposes only. Similarly, it should be understood that any suitable number of wheel assemblies may be used, and that the four wheel assemblies 216a, 216b, 216c, 216d are shown for exemplary purposes only. Further, it should be understood that the wheel assemblies 216a, 216b, 216c, 216d may be mounted at any suitable location relative to the arms 204a, 204b, 204c, 204d, and the end-mounted configuration shown in FIG. 10 is shown for exemplary purposes only.

Similar to the previous embodiment, each wheel assembly may be substantially identical to the other wheel assemblies. As shown, each wheel assembly 216a, 216b, 216c, 216d includes a corresponding steering yoke 220a, 220b, 220c, 220d for mounting a respective wheel 218a, 218b, 218c, 218d thereon. Similar to the previous embodiment, it should be understood that the overall configuration, size and appearance of the wheels 218a, 218b, 218c, 218d are shown for exemplary purposes only. Each of wheels 218a, 218b, 218c, 218d may be any suitable type of wheel, including but not limited to, a self-driven, motorized wheel.

Similar to the previous embodiment, an electric slip ring 222a, 222b, 222c, 222d is mounted on the corresponding steering yoke 220a, 220b, 220c, 220d, coaxially with a corresponding kingpin 224a, 224b, 224c, 224d. As in the previous embodiment, a first end of an eccentric crank arm 226a, 226b, 226c, 226d is rigidly attached to an upper end of the corresponding kingpin 224a, 224b, 224c, 224d, and a wheel crank pin 232a, 232b, 232c, 232d is mounted on an opposed second end of the corresponding eccentric crank arm 226a, 226b, 226c, 226d. A rotor plate 234a, 234b, 234c, 234d is disposed between the upper end of the corresponding electric slip ring 222a, 222b, 222c, 222d and the corresponding eccentric crank arm 226a, 226b, 226c, 226d. Driven rotation of each eccentric crank arm 226a, 226b, 226c, 226d, as it swings relative to the corresponding rotor plate 234a, 234b, 234c, 234d, drives rotation of the corresponding kingpin 224a, 224b, 224c, 224d to steer the corresponding wheel 218a, 218b, 218c, 218d.

Figure 11:
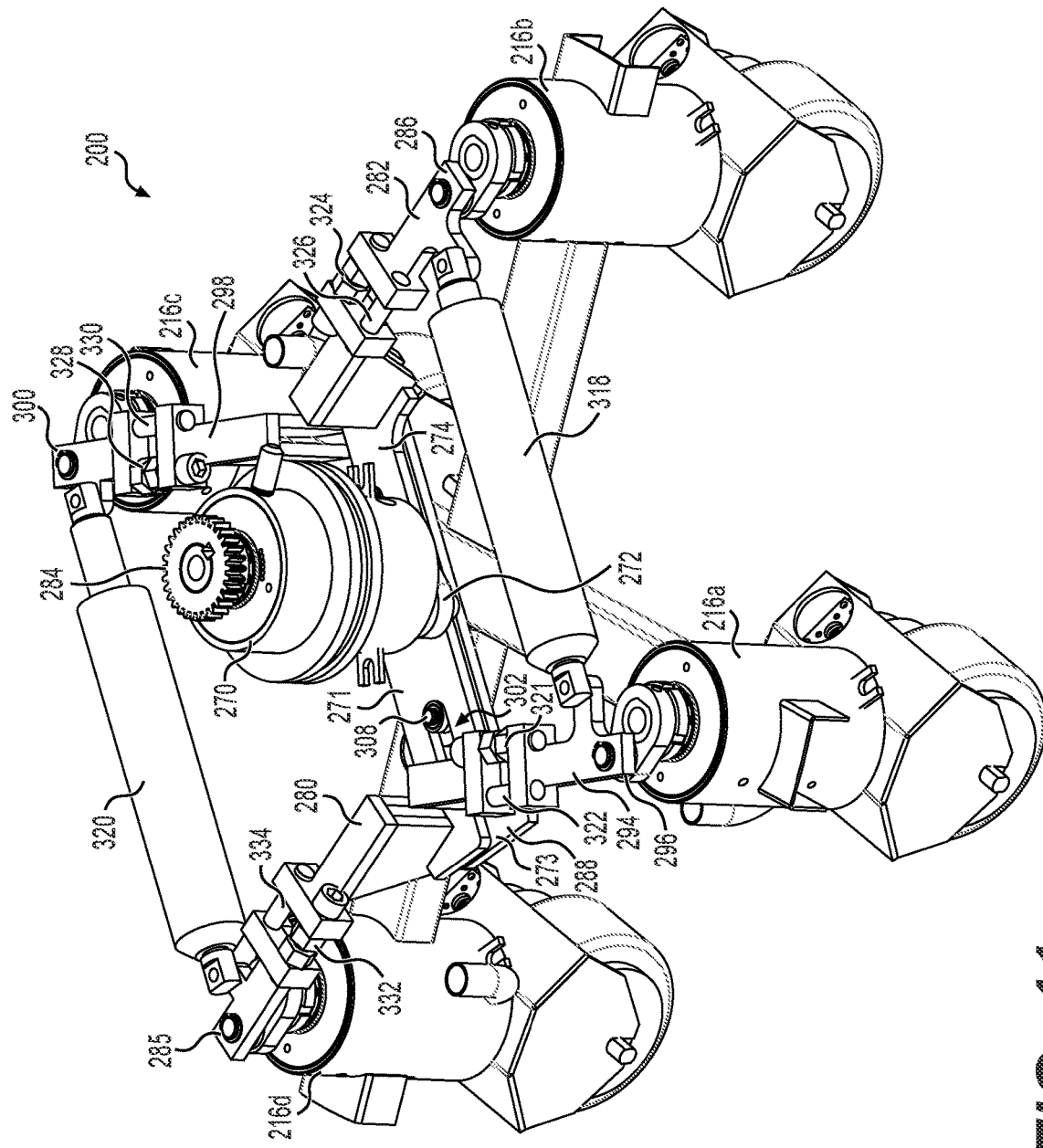
FIG. 11 is a perspective view of the parallel maneuvering system of FIG. 10, shown with linear actuators for reconfiguring the steering linkage.

In FIGS. 10 and 11, a steering actuator 270 is provided, which transfers rotation of a steering gear 284 into rotation of an eccentric steering crank arm 272. Steering gear 284 may be driven to rotate by any suitable type of rotational drive, including a rotational actuator, a steering wheel (as will be discussed below), or the like. The eccentric steering crank arm 272 drives eccentric steering rotation in a manner similar to the connection of steering crank pin 62 to the central bar 74 of the first coupler 70 in the previous embodiment. The steering operation acts in a manner similar to that described above with respect to parallel maneuvering system 10.

In order to transmit the rotational movement of eccentric steering crank arm 272 to each of the wheel assemblies 216a, 216b, 216c, 216d to cause wheel assemblies 216a, 216b, 216c, 216d to be steered simultaneously, first and second couplers 271, 273 connect eccentric steering crank arm 272 to each of the wheel crank pins 232a, 232b, 232c, 232d of wheel assemblies 216a, 216b, 216c, 216d, respectively. Similar to the previous embodiment, the first coupler 271 includes a central bar 274 having opposed first and second ends 276, 278. A first coupling arm 280 is attached to and extends from the first end 276 such that a free end 285 thereof is pivotally attached to the wheel crank pin 232d of the wheel assembly 216d. A second coupling arm 282 is attached to and extends from the second end 278 such that a free end 286 thereof is pivotally attached to the wheel crank pin 232b of the wheel assembly 216b.

The second coupler 273 also includes a central bar 288 having opposed first and second ends 290, 292. A third coupling arm 294 is attached to and extends from the first end 290 such that a free end 296 thereof is pivotally attached to the wheel crank pin 232a of the wheel assembly 216a. A fourth coupling arm 298 is attached to and extends from the second end 292 such that a free end 300 thereof is pivotally attached to the wheel crank pin 232c of the wheel assembly 216c. Similar to the previous embodiment, eccentric steering crank arm 272 is attached to the central bar 274 of the first coupler 27a, and the central bar 288 of the second coupler 273 is slidably mounted on the central bar 274. Thus, as the steering crank arm 272 is driven to rotate along its eccentric path, the entire structure formed from the first coupler 271 and the second coupler 273 is also driven to rotate along the same rotating angular path, thus simultaneously driving the steering rotation of each wheel assembly 216a, 216b, 216c, 216d.

As in the previous embodiment, the central bar 274 of the first coupler 271 axially slides with respect to the central bar 288 of the second coupler 273. One or more slots 302, 304 may be formed through the central bar 288 of the first coupler 271 for receiving corresponding rollers 308, 310, which are attached to the central bar 274 of the second coupler 273 to maintain the sliding relationship in the axial direction alone. In order to effect sliding of the first coupler 271 with respect to the second coupler 273 (or vice versa), similar to the previous embodiment, one or more linear actuators 318, 320 may be used. In FIG. 11, linear actuator 318 is shown pivotally attached at either end to free end 296 of the third coupling arm 294 and the free end 286 of the second coupling arm 282, and linear actuator 320 is shown pivotally attached at either end to the free end 285 of the first coupling arm 280 and the free end 300 of the fourth coupling arm 298. It should be understood that the linear actuators may be attached to the other adjacent pairs of coupling arms. It should be understood that linear actuators 318, 320 may be any suitable type of linear actuators, motors or the like. Additionally, similar to the previous embodiment, each coupling arm may include a respective arm length adjuster 321, 324, 328, 332, allowing for small adjustments to be made to the length of each coupling arm. Arm length adjusters 321, 324, 328, 332 operate in a manner similar to that of the previous embodiment, and each may also be coupled with a corresponding rigidity balancer 322, 326, 330, 334, respectively, in order to prevent unwanted rotary movement caused by loosening or tightening of the arm length adjusters 321, 324, 328, 332.

Figure 12:
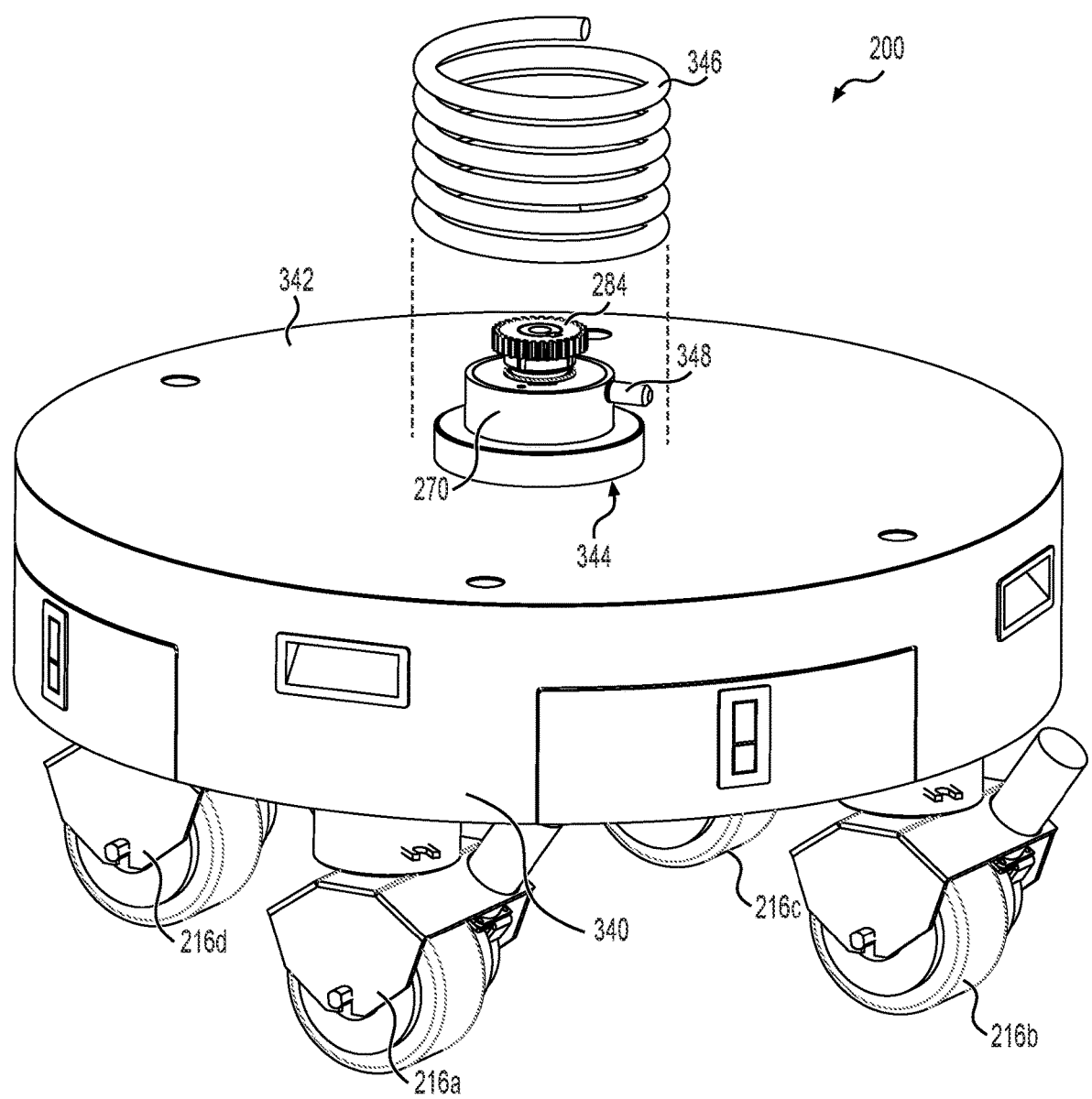
FIG. 12 is a perspective view of the parallel maneuvering system of FIG. 10, shown with a chassis cover mounted over the steering linkage.

It should be understood that, in FIG. 10, the linear actuators 318, 320 are not shown in order to clearly illustrate the first and second couplers 271, 273. Further, it should be understood that FIGS. 10 and 11 do not show the outer chassis in order to best illustrate the steering operation of the parallel maneuvering system 200. In FIG. 12, an example of a circular chassis 340 for the parallel maneuvering system 200 of FIGS. 10 and 11 is illustrated, including a corresponding circular cover 342. As shown, the steering actuator 270 partially projects through a central opening 344 formed through the circular cover 342, allowing the steering gear 284 to be connected to an external source of rotational drive, such as a rotational actuator, a steering wheel (as will be discussed below), or the like. Further, as shown, a shock absorbing coil 346 (or any other suitable type of suspension) may be mounted on the cover 342 about the steering actuator 270, allowing for the stabilized mounting of a platform, a tool or the like. It should be understood that any suitable additional components may also be added. FIG. 12 shows an exemplary angular transducer 348 that may be coupled with the steering actuator 270 for monitoring and controlling the angular orientation of the steering crank arm 272. Any monitored deviation from the intended angular steering direction can be, for example, balanced by adjusting the speed of the corresponding self-driven, motorized wheel.

Figure 13:
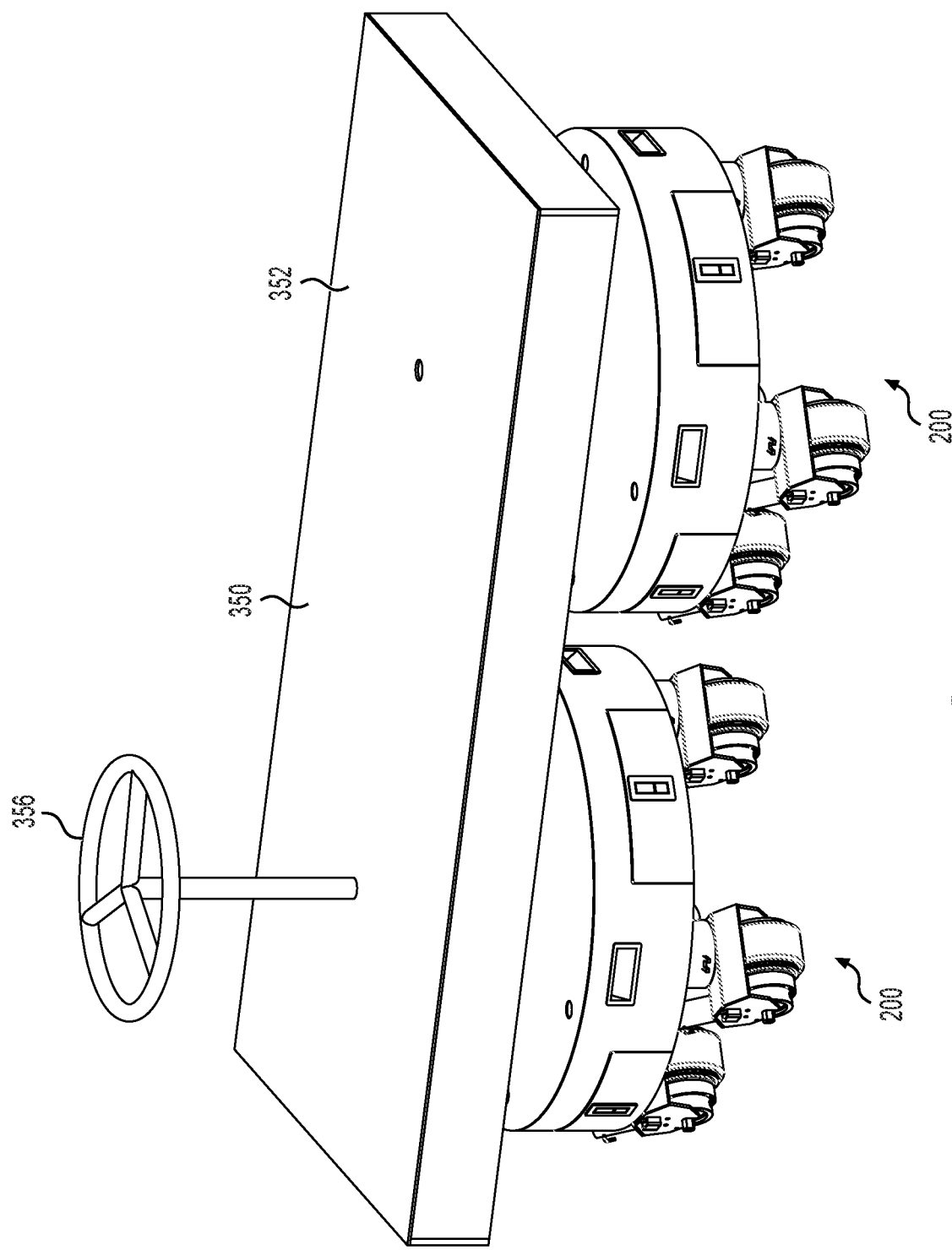
FIG. 13 shows a pair of the parallel maneuvering systems of FIG. 10 used in combination to support a platform.
Figure 14:
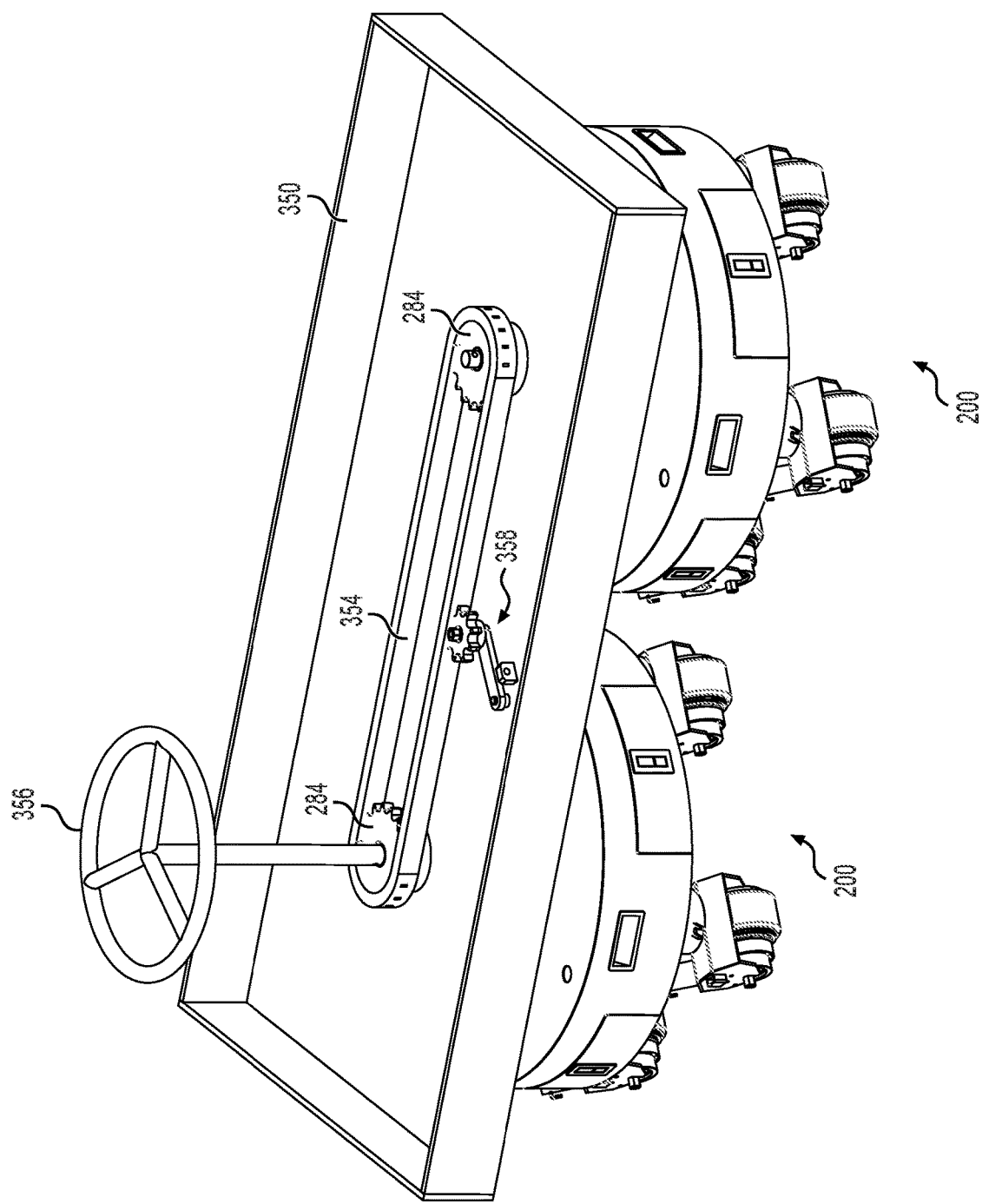
FIG. 14 is a perspective view of the pair of parallel maneuvering systems of FIG. 13, shown without a platform cover to show details of the steering actuator.

As shown in FIGS. 13 and 14, the parallel maneuvering system 200 may be used to support and transport a platform 350. In FIGS. 13 and 14, two such parallel maneuvering systems 200 are shown. However, it should be understood that any desired number of parallel maneuvering systems 200 may be used. Further, it should be understood that the platform 350 is shown for exemplary purposes only, and may have any desired overall configuration and relative dimensions. It should also be understood that the platform 350 may, alternatively, be supported and transported by one or more of the parallel maneuvering systems 10.

In FIG. 14, the cover 352 of the platform 350 has been removed in order to show that the steering gear 284 of each of the parallel maneuvering systems 200 is mounted within the interior of the platform 350. As shown, in order to synchronize steering between the parallel maneuvering systems 200, a chain or belt 354 of a chain and sprocket or belt linkage couples both steering gears 284. Thus, as the steering gear 284 of one of the parallel maneuvering systems 200 is driven to rotate, the steering gear 284 of the other parallel maneuvering system 200 rotates simultaneously at the same angular rate and in the same angular direction. In this way, the wheels of each parallel maneuvering system 200 move in a parallel and simultaneous manner.

In FIGS. 13 and 14, an exemplary steering wheel 356 is attached to the steering gear 284 of one of the parallel maneuvering systems 200 to manually drive rotation thereof. As discussed above, any suitable type of driven rotation can be used, and it should be understood that the steering wheel 356 is shown for exemplary purposes only. Some examples of alternative rotational drives for steering gear 284 include rotational actuators, motors and the like. Further, as shown, a chain tightening device 358 may also be mounted within the platform 350 to manually adjust the tightness of the chain or belt 354, as needed. It should be understood that the chain tightening device 358 is optional and shown for exemplary purposes only.

Figure 15:
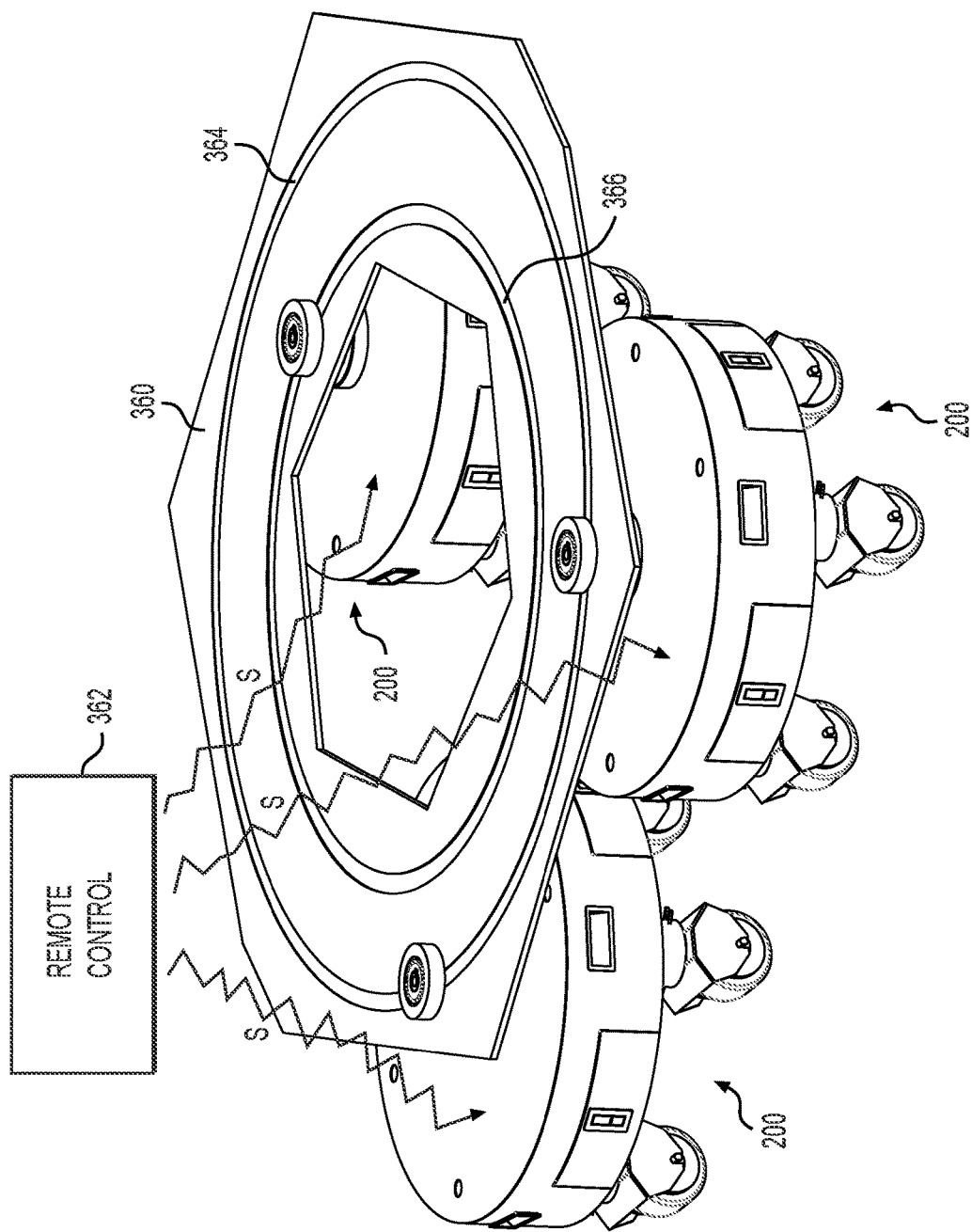
FIG. 15 is a perspective view showing an alternative configuration of a mobile unit having at least two of the parallel maneuvering systems of FIG. 10 linked together.

As noted above, any desired number of parallel maneuvering systems 200 may be linked together. In the further exemplary configuration of FIG. 15, three such parallel maneuvering systems 200 are linked together by central pivotal attachment of each to a platform 360, although it should be understood that three parallel maneuvering systems 200 are shown for exemplary purposes only, and that two or more such parallel maneuvering systems 200 may be linked in this configuration. It should be further understood that the platform 360 is shown for exemplary and illustrative purposes only and may have any suitable shape, relative dimensions or overall configuration. In this example, two of the parallel maneuvering systems 200 are shown pivotally attached to an outer circular track 364, and one of the parallel maneuvering systems 200 is shown pivotally attached to an inner circular track 366, which is positioned concentrically with the outer circular track 364. It should be understood that the number of parallel maneuvering systems assigned to each track is shown in FIG. 15 for exemplary purposes only and may be varied. In addition to central pivotal attachment of each parallel maneuvering systems 200 to the platform 360, each parallel maneuvering system 200 can also maneuver circumferentially with respect to its corresponding track.

Unlike the embodiment of FIGS. 13 and 14, where the steering gears 384 of parallel maneuvering systems 200 are coupled, in FIG. 15, each parallel maneuvering system 200 steers independently from the other parallel maneuvering systems 200. Instead of the exemplary steering wheel 356 of FIGS. 13 and 14, in FIG. 15, each parallel maneuvering system 200 carries a remotely controlled rotational actuator, motor or the like. Thus, when the remote control 362 transmits control signals S to each of the parallel maneuvering systems 200, the onboard, remotely controlled rotational actuators, motors or the like operate simultaneously to drive simultaneous and equal rotation of each steering gear 384 of each parallel maneuvering system 200. As discussed above with regard to FIG. 12, an angular transducer 348 is coupled to each steering actuator 270 for monitoring and controlling the angular orientation of the corresponding steering crank arm 272. Thus, each of the linked parallel maneuvering systems 200 can monitor its own angular orientation and make any necessary corrections to properly orient itself with respect to the other parallel maneuvering systems 200 linked by the platform 360. It should be understood that any suitable type of remote control may be used, and that the remote control 362 can be replaced by, or used in conjunction with, an onboard programmable controller.

It is to be understood that the parallel maneuvering system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A parallel maneuvering system, comprising:
   a first coupler including a first central bar having a first end and a second end, a first coupling arm attached to and extending orthogonally from the first end of the first central bar, and a second coupling arm attached to and extending orthogonally from the second end of the first central bar, the first and second coupling arms each having a free end;
   a second coupler including a second central bar having a first end and a second end, a third coupling arm attached to and extending orthogonally from the first end of the second central bar, and a fourth coupling arm attached to and extending orthogonally from the second end of the second central bar, the third and fourth coupling arms each having a free end, the second central bar of the second coupler being slidably mounted on the first central bar of the first coupler;
   first, second, third and fourth wheel assemblies, each of the wheel assemblies having:
   a steering yoke;
   a ground-engaging wheel rotationally mounted on the steering yoke;
   a kingpin extending from the steering yoke;
   an electric slip ring coaxially mounted on the kingpin above the steering yoke; and
   a crank arm having a first end attached to the kingpin, the crank arm having extending from the kingpin and having a second end having a wheel crank pin mounted thereon eccentric to the kingpin, rotation of the crank arm steering the ground-engaging wheel, the wheel crank pin of the first, second, third, and fourth wheel assemblies being pivotally attached to the free end of the first, second, third, and fourth coupling arms, respectively;
   at least one linear actuator attached between the first coupler and the second coupler, the at least one linear actuator having a retracted position locking the first and second couplers in an H-shaped configuration with the first, second, third, and fourth wheel assemblies defining corners of a rectangle for turning the four wheels simultaneously in parallel for translational movement and an extended position sliding the first and second couplers laterally for rotational movement;
   a steering actuator assembly having a steering crank pin pivotally attached to the first central bar of the first coupler to drive simultaneous steering rotation of the first and second couplers and simultaneous steering of the four ground-engaging wheels in parallel when the at least one linear actuator is in the retracted position; and
   a hollow chassis adapted for supporting a load, the first and second couplers being mounted within the hollow chassis, and the first, second, third and fourth wheel assemblies being mounted to the hollow chassis such that the respective ground-engaging wheels thereof are mounted external to the hollow chassis, and the respective eccentric crank arms thereof are mounted within the hollow chassis.

2. The parallel maneuvering system as recited in claim 1, wherein the first coupling arm and the second coupling arm extend from the first central bar in opposite parallel directions.

3. The parallel maneuvering system as recited in claim 2, wherein the third coupling arm and the fourth coupling arm extend from the second central bar in opposite parallel directions.

4. The parallel maneuvering system as recited in claim 1, wherein each of said first, second, third and fourth wheel assemblies further comprises a rotor plate disposed between an upper end of the electric slip ring and the eccentric crank arm.

5. The parallel maneuvering system as recited in claim 1, further comprising first, second, third and fourth steering brakes mounted within the hollow housing for respectively selectively applying braking to angular steering movement of the first, second, third and fourth wheel assemblies.

6. The parallel maneuvering system as recited in claim 1, wherein said steering actuator assembly comprises:
   a rotational actuator;
   a drive gear coupled to the rotational actuator;
   an intermediate gear coupled to the drive gear; and
   a driven gear coupled to the intermediate gear, the steering crank pin being mounted eccentrically on the driven gear.

7. The parallel maneuvering system as recited in claim 6, further comprising a clutch attached to the intermediate gear for selectively disengaging the intermediate gear from the drive gear and the driven gear.

8. The parallel maneuvering system as recited in claim 1, wherein each of the first, second, third and fourth coupling arms further comprises a length adjuster for fine adjustments of the length of the arms to fit the chassis.

9. The parallel maneuvering system as recited in claim 1, wherein said steering actuator assembly comprises a steering actuator and a gear train engaging the steering actuator, the steering crank pin being eccentrically mounted on the gear train.

10. The parallel maneuvering system as recited in claim 1, wherein the wheel of each of said first, second, third, and fourth wheel assemblies comprises a Mecanum wheel.

11. A mobile platform device, comprising:
    at least two parallel maneuvering systems according to claim 10; and
    a platform having at least one circular track, the at least two parallel maneuvering systems each being pivotally and slidably mounted on the at least one circular track at fixed angular locations with respect to one another.

12. The mobile platform device as recited in claim 11, further comprising an angular transducer coupled to each of the steering actuators of each of the parallel maneuvering systems for monitoring and controlling angular orientation of the eccentric steering thereof.

13. The mobile platform device as recited in claim 11, wherein the at least one circular track comprises an inner circular track and an outer circular track, the inner and outer circular tracks being concentric with respect to one another.

14. The parallel maneuvering system according to claim 1, wherein each of the wheels of said wheel assemblies is turned to a circular configuration in order to permit a zero-radius turn when said at least one linear actuator is in the extended position.

15. A mobile platform device, comprising:
at least two parallel maneuvering systems according to claim 1; and
a hollow platform mounted on the at least two parallel maneuvering systems, the hollow chasses of the at least two parallel maneuvering systems being mounted external to the hollow platform, and the steering actuator assembly of each of the at least two parallel maneuvering systems being mounted within the hollow platform and including a steering gear.

16. The parallel maneuvering system as recited in claim 15, further comprising an endless loop rotationally coupling the steering gears of the at least two parallel maneuvering systems.

17. The parallel maneuvering system as recited in claim 16, further comprising a loop tightener for selectively adjusting tightness of the endless loop.

18. The parallel maneuvering system as recited in claim 16, further comprising a steering wheel for directly driving rotation of one of the steering gears of the at least two parallel maneuvering systems.

\* \* \* \* \*